(12) United States Patent
Doman et al.

(10) Patent No.: US 8,700,233 B1
(45) Date of Patent: Apr. 15, 2014

(54) METHOD FOR SHAPING WING VELOCITY PROFILES FOR CONTROL OF FLAPPING WING MICRO AIR VEHICLES

(75) Inventors: David B. Doman, Springfield, OH (US); Michael W. Oppenheimer, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 648 days.

(21) Appl. No.: 12/883,317

(22) Filed: Sep. 16, 2010

Related U.S. Application Data

(60) Provisional application No. 61/368,670, filed on Jul. 29, 2010.

(51) Int. Cl.
*B64C 33/00* (2006.01)

(52) U.S. Cl.
USPC .......... 701/4; 701/3; 244/11; 244/22; 244/72; 446/35

(58) Field of Classification Search
USPC .............. 701/3, 4, 10; 244/11, 22, 72; 446/35
See application file for complete search history.

(56) References Cited

U.S. PATENT DOCUMENTS

| | | | |
|---|---|---|---|
| 4,195,438 A | | 4/1980 | Dale et al. |
| 4,712,749 A | * | 12/1987 | Fox .................... 244/22 |
| 5,884,872 A | | 3/1999 | Greenhalgh |
| 5,899,408 A | | 5/1999 | Bowers, Jr. |
| 6,082,671 A | * | 7/2000 | Michelson .............. 244/72 |
| 6,206,324 B1 | * | 3/2001 | Smith ................... 244/72 |
| 6,227,483 B1 | | 5/2001 | Therriault |
| 6,550,716 B1 | | 4/2003 | Kim et al. |
| 6,568,634 B2 | * | 5/2003 | Smith ................... 244/72 |
| 6,659,397 B1 | | 12/2003 | Charron |
| 6,769,949 B2 | | 8/2004 | Kim et al. |
| 6,783,097 B1 | * | 8/2004 | Smith ................... 244/72 |
| 6,802,473 B2 | | 10/2004 | Charron |
| 6,840,476 B1 | | 1/2005 | Raney |
| 6,938,853 B2 | * | 9/2005 | Pines et al. ............ 244/11 |
| 6,959,895 B2 | | 11/2005 | Cylinder |
| 7,204,455 B2 | * | 4/2007 | Sinclair ................ 244/72 |
| 7,219,855 B2 | * | 5/2007 | Hamamoto et al. ...... 244/72 |
| 7,331,546 B2 | | 2/2008 | Ifju et al. |
| 7,341,222 B1 | | 3/2008 | Reuel |

(Continued)

OTHER PUBLICATIONS

R. Wood, "The First Takeoff of a Biologically Inspired At-Scale Robotic Insect," IEEE Transactions on Robotics, vol. 24, No. 2, pp. 341-347, Apr. 2008.*

(Continued)

*Primary Examiner* — Thomas Black
*Assistant Examiner* — Peter D Nolan
(74) *Attorney, Agent, or Firm* — AFMCLO/JAZ; Fredric Sinder

(57) ABSTRACT

A method of controlling wing position and velocity for a flapping wing air vehicle provides six-degrees-of-freedom movement for the aircraft through a split-cycle constant-period frequency modulation with wing bias method that generates time-varying upstroke and downstroke wing position commands for wing planforms to produce nonharmonic wing flapping trajectories that generate non-zero, cycle averaged wing drag and alter the location of the cycle-averaged center of pressure of the wings relative to the center of gravity of the aircraft to cause horizontal translation forces, rolling moments and pitching moments of the aircraft.

16 Claims, 5 Drawing Sheets

(56) References Cited

U.S. PATENT DOCUMENTS

| | | | |
|---|---|---|---|
| 7,600,712 B2 | 10/2009 | Higham | |
| 7,607,610 B1* | 10/2009 | Sterchak | 244/72 |
| 7,651,051 B2* | 1/2010 | Agrawal et al. | 244/22 |
| 2005/0269447 A1* | 12/2005 | Chronister | 244/72 |
| 2007/0210207 A1* | 9/2007 | Liao | 244/22 |
| 2012/0292438 A1* | 11/2012 | Sreetharan et al. | 244/72 |

OTHER PUBLICATIONS

L. Schenato, D. Campolo, S. Sastry, "Controllability issues in flapping flight for biomimetic Micro Aerial Vehicles (MAVs)," In. Proc. 42nd IEEE Conf. on Decision and Control, pp. 6441-6447, Dec. 2003.*

J. Han, J. Lee, D. Kim, "Bio-inspired Flapping UAV Design: A University Perspective," In Proc. SPIE, vol. 7295, Mar. 2009.*

X. Deng, L. Schenato and S. Sastry, "Flapping Flight for Biomimetic Robotic Insects: Part II—Flight Control Design," Robotics, IEEE Transactions on 22.4 (2006).*

L. Schenato, X. Deng and S. Sastry, "Flight Control System for a Micromechanical Flying Insect: Architecture and Implementation," In Proc. IEEE International Conference on Robotics and Automation (2001).*

D. Doman et al., "Wingbeat Shape Modulation for Flapping-Wing Micro-Air-Vehicle Control During Hover", Journal of Guidance, Control, and Dynamics, vol. 33, No. 3, May-Jun. 2010, pp. 724-739.

M. Oppenheimer et al., "Dynamics and Control of a Biomimetic Vehicle Using Biased Wingbeat Forcing Functions: Part I—Aerodynamic Model", $48^{th}$ AIAA Aerospace Sciences Meeting including the New Horizons Forum and Aerospace Exposition, Jan. 4-7, 2010, Orlando, FL.

D. Doman et al., "Dynamics and Control of a Biomimetic Vehicle Using Biased Wingbeat Forcing Functions: Part II—Controller", $48^{th}$ AIAA Aerospace Sciences Meeting including the New Horizons Forum and Aerospace Exposition, Jan. 4-7, 2010, Orlando, FL.

D. Doman et al., "Dynamics and Control of a Minimally Actuated biomimetic Vehicle: Part I—Aerodynamic Model", AIAA Guidance, Navigation, and Control Conference, Aug. 10-13, 1009, Chicago, IL.

M. Oppenheimer et al, "Dynamics and Control of a Minimally Actuated biomimetic Vehicle: Part II—Control", AIAA Guidance, Navigation, and Control Conference, Aug. 10-13, 1009, Chicago, IL.

* cited by examiner

METHOD FOR SHAPING WING VELOCITY PROFILES FOR CONTROL OF FLAPPING WING MICRO AIR VEHICLES

CROSS REFERENCE TO RELATED APPLICATIONS

This application claims benefit of priority from U.S. Provisional Application Ser. No. 61/368,670, which was filed in the United States Patent and Trademark Office on Jul. 29, 2010.

RIGHTS OF THE GOVERNMENT

The invention described herein may be manufactured and used by or for the Government of the United States for all governmental purposes without the payment of any royalty.

TECHNICAL FIELD

This application discloses methods and apparatuses that shape wing velocity profiles for controlling flapping wing micro air vehicles.

BACKGROUND

Research in the area of flapping wing flight has been conducted by the biological and engineering communities. Researchers have studied the flight dynamics of animals and ornithopters. However, none of these efforts has resulted in an aircraft capable of six-degrees-of-freedom flight with only two actuators.

SUMMARY OF INVENTION

The disclosed method and apparatus enable biomimetic micro-robotic aircraft to achieve insect-like maneuverability with two physical actuators and limited flight control computer processing power. The disclosed method and apparatus provide controlled six-degree-of-freedom flight for an aircraft with wings that have only one degree of freedom and one actuator each. They do so by independently actuating the wings with position and velocity profiles that can be manipulated to generate controllable forces and moments that enable the aircraft to achieve insect-like maneuverability. This method enables a reduction in the weight and complexity of the aircraft while enhancing its performance.

A method of shaping a wing velocity profile for an aircraft having a first wing planform and a second wing planform that perform an upstroke and a downstroke over a complete wingbeat cycle comprises generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments.

A method of controlling wing velocity of a wing planform of a flapping wing air vehicle using split-cycle constant period frequency modulation with wing bias control to generate time-varying upstroke and downstroke wing position commands comprises calculating an upstroke, a first half downstroke, and a second half downstroke position command for the wing planform; determining if the wing planform is in an upstroke, first half downstroke, or second half downstroke position; outputting an appropriate wing position command depending on the position of the wing planform; and converting the wing position command to a voltage and applying the voltage to a piezoelectric strip to change the position of the wing planform.

A split-cycle constant-period with wing bias waveform generator for controlling the position of a wing planform to produce temporally asymmetric wing positions and velocities for the wing planform over a wingbeat cycle comprises an upstroke computation block for computing an upstroke command for the wing planform; a first multiplier that receives the upstroke command from the upstroke computation block and multiplies the upstroke command by a binary value based on the position of the wing planform to generate an upstroke wing position command; a first half downstroke computation block for computing a first half downstroke command for the wing planform; a second multiplier that receives the first half downstroke command from the first half downstroke computation block and multiplies the first half downstroke command by a binary value based on the position of the wing planform to generate a first half downstroke wing position command; a second half downstroke computation block for computing a second half downstroke command for the wing planform; a third multiplier that receives the second half downstroke command from the second half downstroke computation block and multiplies the second half downstroke command by a binary value based on the position of the wing planform to generate a second half downstroke wing position command; a summer that receives and adds the upstroke wing position command, the first half downstroke wing position command, and the second half downstroke wing position command to generate a position command signal for the wing planform; and a converter that converts the position command signal to a voltage that is applied to a piezoelectric strip to change the position and velocity of the wing planform.

A flight control system for a flapping wing aircraft comprising an operator command processor that generates instantaneous values of a desired state of the aircraft as inertial positions and aircraft attitude; a sensor package that includes an inertial measurement unit, a GPS receiver, and an air data system that provides an actual position of the aircraft and an orientation of the fuselage of the aircraft; a flight control computer that receives the inertial position and aircraft attitude values from the operator command processor and compares those values to the actual aircraft position and fuselage orientation that is received from the sensor package and generates a vector of desired cycle averaged force and moment commands; a control allocator that converts the desired cycle averaged forces and moments output from the flight control computer into a waveform parameter command for each of the flapping wings of the aircraft; a waveform generator that receives the waveform parameter command for each flapping wing and generates a time varying voltage for a piezoelectric strip that powers a respective wing to generate a desired flapping motion for each respective wing that produces aerodynamic forces and moments that cause the fuselage to be attracted to the desired position and attitude specified by the operator command processor.

DETAILED DESCRIPTION

Figure 1:
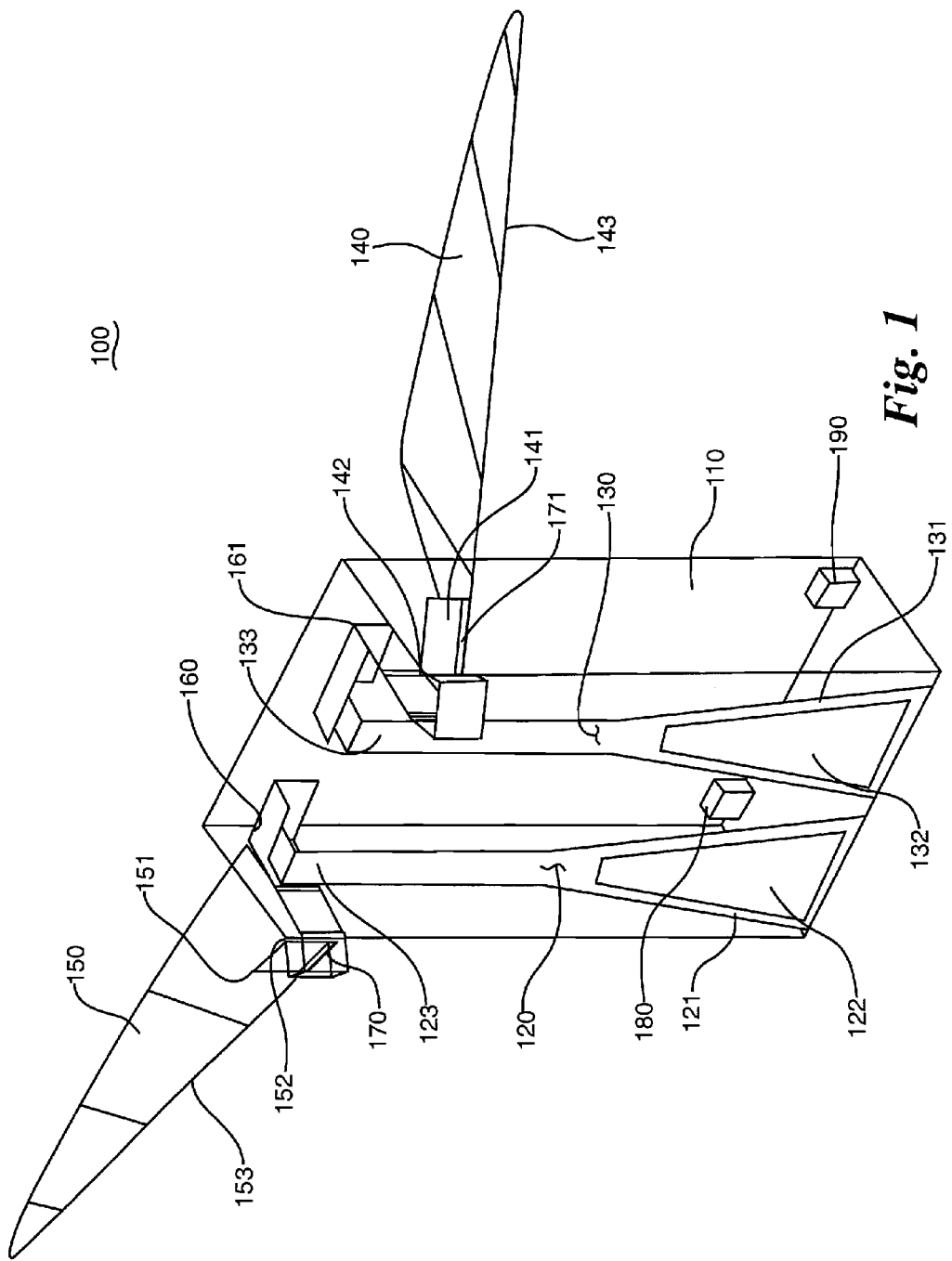
FIG. 1 is a perspective view of a flapping wing aircraft with independently actuated wings.
Figure 2:
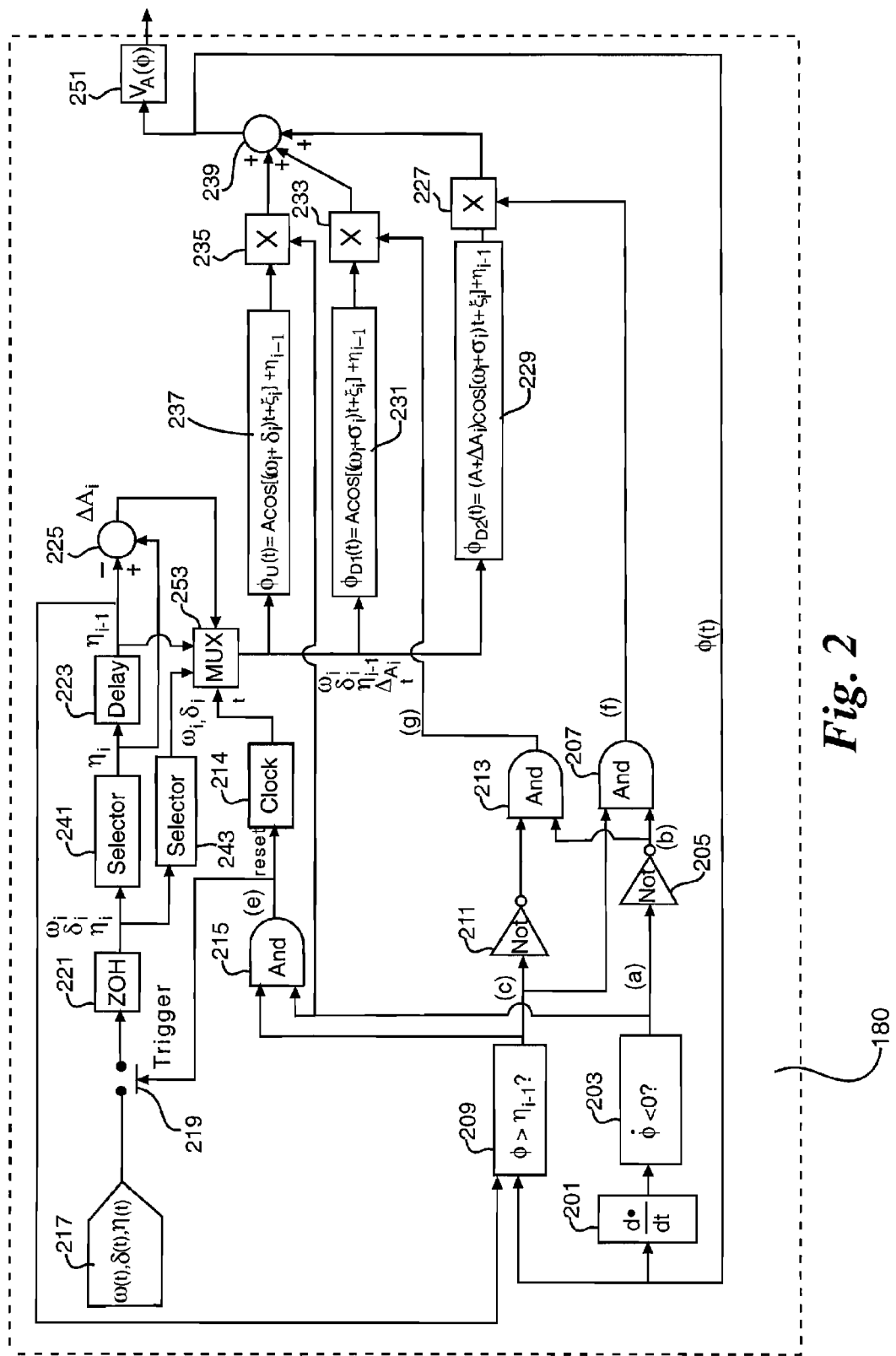
FIG. 2 is a block diagram of a waveform generator.

As shown in FIG. 1, an aircraft 100 comprises a fuselage 110, biomorph actuators 120, 130, wing planforms 140, 150, linkages 160, 161, flexure joints 170, 171, wing roots 141, 151, wing root hinges 142, 152, a flight control wave form generator 180, and a power source 190.

Each wing planform 140, 150 is rigidly attached to a wing spar 143, 153 that extends along a leading edge of a respective wing planform 140, 150. Each wing spar 143, 153 is connected to a linkage 160, 161 via a flexure joint 170, 171. Each wing spar 143, 153 is also connected to a wing root 141, 151. Each wing root 141, 151 connects to the fuselage 110 via one of the wing root hinges 142, 152. The connection of the wing spars 143, 153 to the flexure joints 170, 171 allows the wing planforms 140, 150 to move passively about a longitudinal axis of each respective wing spar 143, 153 between ±45° with respect to the stroke plane of each wing planform 140, 150. The stroke plane of each wing spar 143, 153 is generally perpendicular to an axis of rotation of a respective wing root hinge 142, 152 to which it is attached via a wing root 141, 151.

Each biomorph actuator 120, 130 comprises a flexible strip 121, 131 and a piezoelectric strip 122, 132. The flexible strips 121, 131 may comprise a carbon fiber composite material. Each flexible strip 121, 131 is connected at one end to the fuselage 110 in a cantilevered fashion. The other end 123, 133 of each flexible strip 121, 131 is connected to one of the linkages 160, 161. Each piezoelectric strip 122, 132 is bonded to a respective flexible strip 121, 131. The piezoelectric strips 122, 132 induce strains in the flexible strips 121, 131 in proportion to a controlled electrical potential that is applied across each piezoelectric strip 122, 132. The controlled electrical potential is supplied to each piezoelectric strip 122, 132 by the flight control waveform generator 180, which is powered by the onboard power source 190. By selectively applying changes in voltage from the flight control waveform generator 180 to the piezoelectric strips 122, 132, the ends 123, 133 of each flexible strip 121, 131 can be made to move linearly. The linear movement of the ends 123, 133 of the flexible strips 121, 131 is transmitted to the linkages 160, 161. The linkages 160, 161 function as slider-crank mechanisms to convert the linear motion of each flexible strip 121, 131 into a rotary motion that drives a respective flexure joint 170, 171, which in turn drives a respective wing planform 140, 150. The configuration of the linkages 160, 161 also provides impedance matching and desired ranges of motion between the inertial and aerodynamic loads created by the motion of the wing planforms 140, 150 and the biomorph actuators 120, 130.

Figure 3:
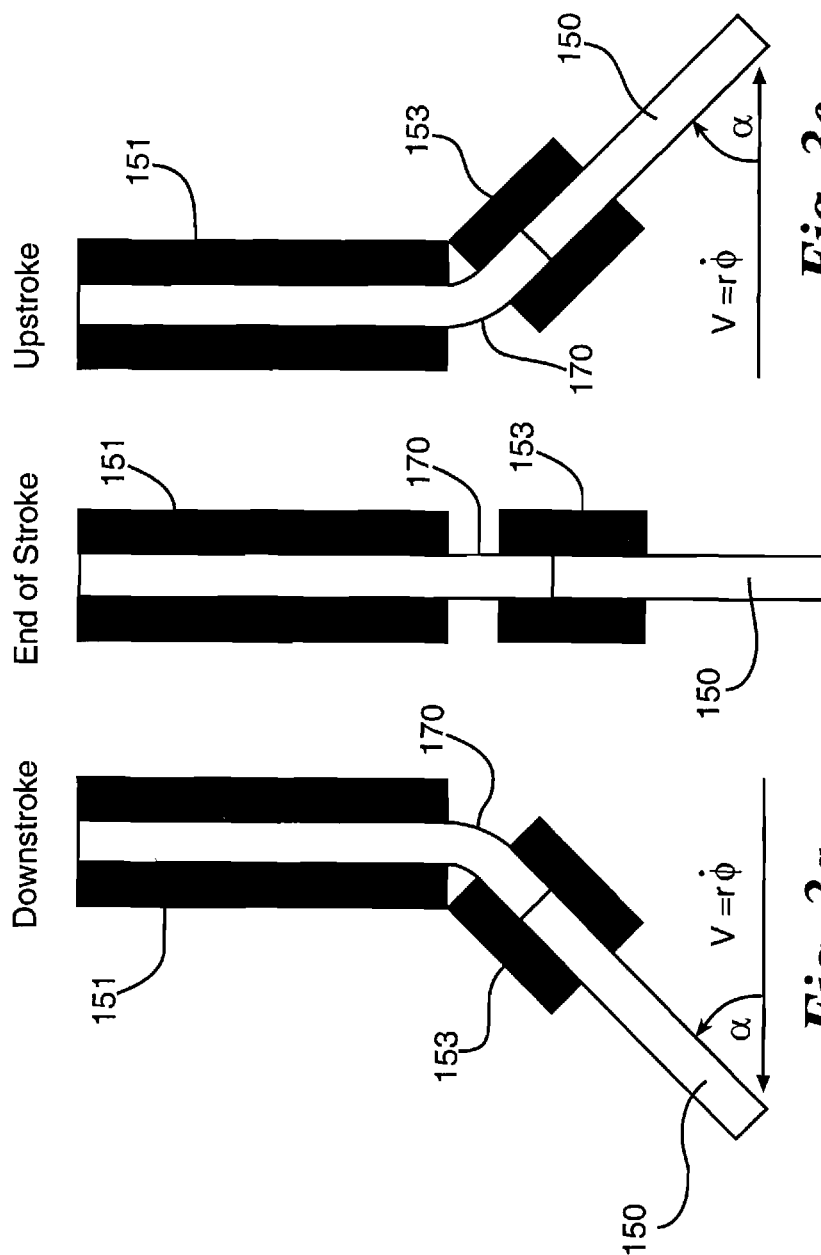
FIGS. 3a-3c show a wing hinge flexure joint in downstroke, upstroke, and end of stroke positions.

As shown in FIGS. 3a-3c for one wing planform 150, the flexure joint 170 is configured so that the wing spar 153 engages the wing root 151 at a predetermined angle α of the wing planform 150 that prevents over-rotation of the wing planform 150. This interference between the wing spar 153 and the wing root 151 causes the wing planform 150 to maintain a constant angle-of-attack relative to the stroke plane once critical dynamic pressure is reached. This configuration passively regulates the angle of attack of the wing planform 150. The other flexure joint 171 provides similar control of the angle-of-attack of the other wing planform 140. This enables the aircraft 100 to be controlled and maneuvered near a hover. This configuration can be used for micro air vehicles with more than two wing planforms, as well.

The aircraft 100 is controlled by driving the biomorph actuators 120, 130 with voltages from the waveform generator 180 to produce specially designed angular displacements of the wing roots 141, 151 and the wing spars 143, 153 in the stroke plane. The resulting velocities of the wing planforms 140, 150 are temporally asymmetric over the wingbeat cycle so that each wing planform 140, 150 produces independently-controlled cycle-averaged body forces in the vertical and horizontal direction while its angle-of-attack is passively regulated by the flexure joints 170, 171. This can be accomplished by parameterizing the waveforms that define the motion of each wing planform 140, 150 in the stroke-plane in terms of temporally symmetric and asymmetric components as well as wing planform position. This method, referred to herein as split-cycle constant-period frequency modulation with wing bias, combines biased cosine waves of different frequencies and amplitudes over a complete wingbeat cycle so the resulting waveform is continuous in position at all transition points. Each wingbeat cycle comprises an upstroke and a downstroke. The period of each cycle is fixed by the symmetric or fundamental frequency, while the speed of each stroke within the cycle is governed by an asymmetric frequency or split-cycle parameter. Because of the constant period constraint, one half of each motion cycle takes place over a longer time interval than the other half.

The split-cycle constant-period frequency modulation with wing bias method disclosed herein generates time-varying upstroke and downstroke wing position commands. The resulting nonharmonic wing flapping trajectories generate non-zero cycle-averaged wing drag that can be controlled to cause horizontal translation forces and rolling moments for hovering micro air vehicles. The wing bias alters the cycle-averaged center of pressure location of each wing planform 140, 150, relative to the center of gravity of the aircraft, and is used to provide pitching moments. Two independently generated waveforms define the respective motion of each wing planform 140, 150. The time t=0 corresponds to the time at which the upstroke begins. The upstroke and downstroke wing angles are:

$$\phi_U(t) = A\cos[(\omega - \delta)t] + \eta \ \forall \ 0 \leq t < \frac{\pi}{\omega - \delta}$$

$$\phi_{D1}(t) = A\cos[(\omega + \sigma)t + \xi] + \eta \ \forall \ \frac{\pi}{\omega - \delta} \leq t < \frac{\pi(3\omega - 2\delta)}{2\omega(\omega - \delta)}$$

$$\phi_{D2}(t) = [A + \Delta A]\cos[(\omega + \sigma)t + \xi] + \eta \ \forall \ \frac{\pi(3\omega - 2\delta)}{2\omega(\omega - \delta)} \leq t \leq \frac{2\pi}{\omega}$$

where $$\sigma = \frac{\delta\omega}{\omega - 2\delta}$$

and $$\xi = \frac{-2\pi\delta}{\omega - 2\delta}$$

The waveform that drives the angular position φ(t) of each wing planform 140, 150 in the stroke plane is defined by the amplitude A, the symmetric frequency ω, wing position bias η, and the asymmetric frequency or split-cycle parameter δ where δ<ω/2.

The waveform generator 180 controls the position of each wing planform 140, 150 and can be used to control the position of more than two wing planforms. The wing position command φ(t) is monitored continuously by logic elements and used to control the wing position command that is applied to each wing planform 140, 150. A resettable clock 214 provides a timebase that generates time varying functions that produce wing position commands. The clock 214 is reset at the start of each upstroke by the positive transition of a binary signal generated by logic elements that detect the beginning of an upstroke. An upstroke computation block 237, a first half downstroke computation block 231, and a last half downstroke computation block 229 continuously compute wing position commands. The output of the upstroke computation block 237 is input to multiplier 235, which multiplies the output of the upstroke computation block 237 by 1 if the wing planform is on the upstroke segment of its wingbeat cycle and multiplies the output of the upstroke computation block 237 by 0 otherwise. The output of the first half downstroke computation block 231 is input to multiplier 233, which multiplies the output of the first half downstroke computation block 231 by 1 if the wing planform is on the first half of the downstroke and by 0 otherwise. The output of the last half downstroke computation block 229 is input to multiplier 227, which multiplies the output of the last half downstroke computation block 229 by 1 if the wing planform is on the last half of the downstroke of the wingbeat cycle and by 0 otherwise. The outputs of the multipliers 235, 233, and 227 are added together by summer 239 to form a position command for each of the first or second wing planforms 140, 150. The output of summing block 239 consists of one and only one signal from blocks 235, 233, and 227 at any particular time instant. The wing planform position that is output from summing block 239 is converted to a voltage by block 251 and this voltage is applied to the first piezoelectric strip 122 if generating a position command for the second wing planform 150 or to the second piezoelectric strip 132 if generating a position command for the first wing planform 140.

Figure 5:
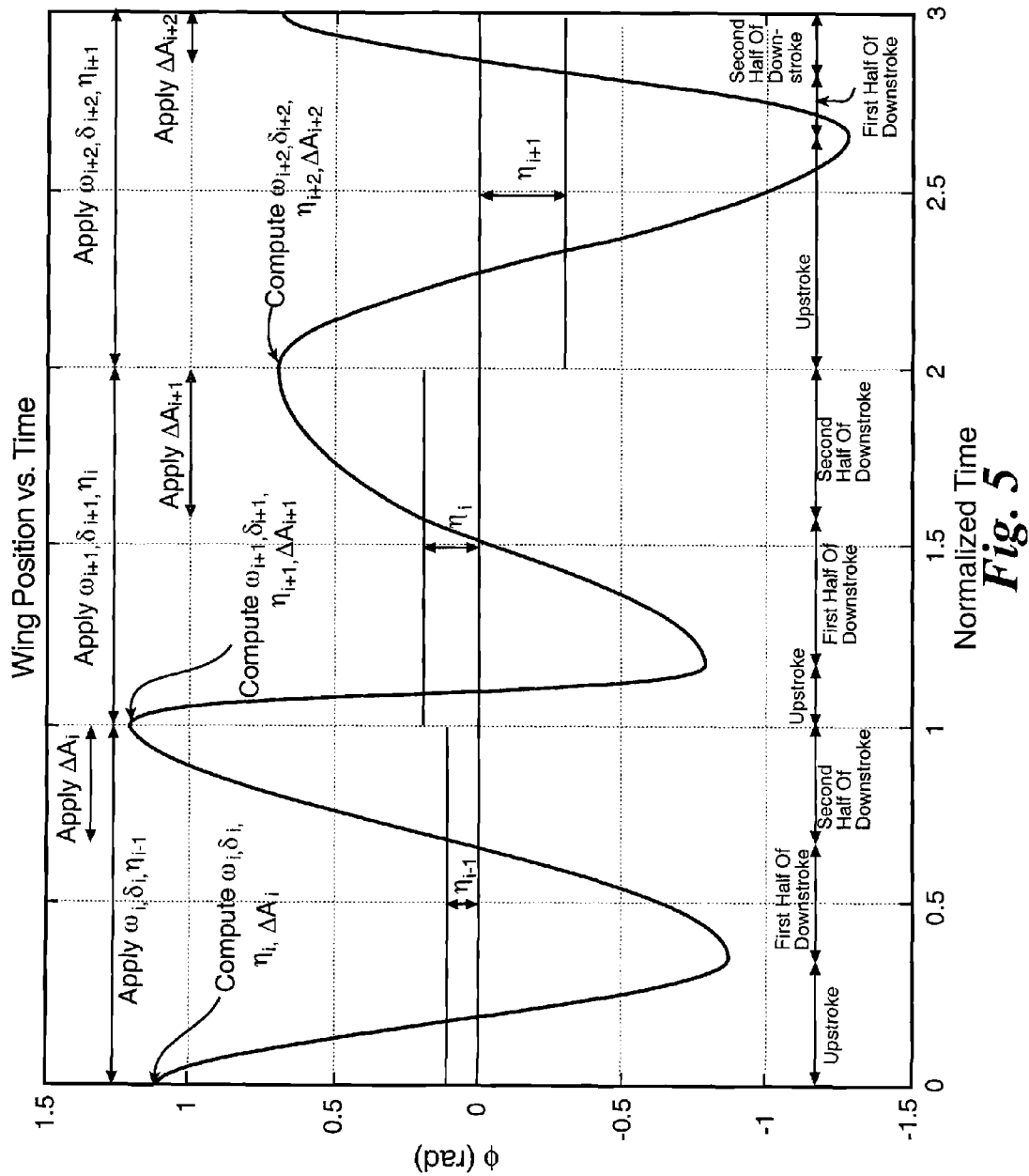
FIG. 5 shows a wing position command waveform.

The instantaneous wing position command is fed through a series of logic elements that supply binary inputs to multipliers 235, 233, and 227. The differentiation block 201 computes the time derivative of the wing position command $\phi(t)$. Comparator 203 generates a binary output that is equal to 1 if the wing angular velocity is less than zero, $\dot{\phi}(t)<0$, and 0 otherwise. If the output of comparator 203 is equal to 1, then the wing is on an upstroke making the output of summer 239 equal to the output of upstroke computation block 237. If the output of block 203 is zero, the wing is on a downstroke segment of the wingbeat cycle. To determine if the wing planform is on the first or second half of the downstroke cycle, comparator 209 generates a value of 1 if the wing position command, $\phi(t)$, is greater than the wing bias, $\eta_{i-1}$. If $\phi(t)>\eta_{i-1}$, the wing is on either the first half of the upstroke or second half of the downstroke. The outputs of comparators 203 and 209 are inverted by inverters 205 and 211, respectively. The output of inverter 205 is 1 if the wing is on the downstroke and 0 otherwise. The output of inverter 211 is 1 if the wing is either on the second half of the upstroke or first half of the downstroke and is 0 otherwise. The output of inverter block 205 and comparator 209 are inputs to an AND gate 207. The output of AND gate 207 is 1 if the wing is on the second half of the downstroke and is 0 otherwise and is also the input to multiplier 227. The output of inverters 205 and 211 are inputs to AND gate 213. The output of AND gate 213 is 1 if the wing is on the first half of the downstroke and 0 otherwise and is also the input to multiplier 233. The outputs of comparators 203 and 209 are inputs to AND gate 215, whose output is one if the wing is on the first half of the upstroke and 0 otherwise. The output of AND gate 215 is input to the reset port of clock 214 and acts to reset the clock to 0 each time an upstroke portion of wingbeat motion starts. The current time from the clock 214 is supplied to multiplexor block 253 to form an element of a data vector that is required to support computation blocks 237, 231, and 229. The clock 214 resets when the binary input signal switches from a low state (0) to a high state (1). Additionally, the output of AND gate 215 closes trigger 219 when it switches from a 0 to a 1 so that trigger 219 is closed only at the start of the upstroke portion of the wingbeat cycle. When trigger 219 closes, current values of $\omega(t)$, $\delta(t)$, and $\eta(t)$ from a control system output block 217 become inputs to zero-order-hold circuit 221. The output of the zero-order-hold circuit 221 consists of discrete time signals $\omega_i$, $\delta_i$, $\eta_i$, which are inputs to selector blocks 241 and 243. The selector block 243 takes a vector input from block 221 and produces an output consisting of only the signals $\omega_i$ and $\delta_i$, which are supplied to multiplexor block 253. Selector block 241 takes a vector input from block 221 and produces a scalar output consisting of only $\eta_i$. The output of selector block 241 is input to delay 223 and summer 225. The output of delay 223 is the value of the wingbeat bias from the previous wingbeat cycle, $\eta_{i-1}$. Summer 225 calculates $\Delta A_i$ by subtracting the output of delay 223 from the output of selector 241. The output of summer 225 is input to multiplexor block 253 which supplies all of the data necessary to construct each portion of the commanded split-cycle waveform, namely $\Delta A_i$, $\omega_i$, $\delta_i$, t, and $\eta_{i-1}$. In the computation blocks 237, 231, 229, $\xi_i$ and $\sigma_i$ are functions of $\omega_i$ and $\delta_i$. The control system inputs that enter through block 217 to the waveform generator 180 are sampled at the beginning of the upstroke and the values of $\omega_i$ and $\delta_i$ in this sample are used to generate the wingbeat function. The bias, that is applied to computation blocks 237, 231, and 229 is the bias that is calculated one complete cycle prior to the start of the current wingbeat cycle. Hence, a delayed value of $\eta$ is utilized. To achieve a continuous wingbeat forcing function, the bias to be applied one complete cycle into the future must be known so that the amplitude change $\Delta A_i$ can be computed. The delay block 223 performs this function. The amplitude change $\Delta A_i$ is applied only to the last half of the downstroke and thus is used only in the last half downstroke computation block 229. The elements of the waveform generator 180 ensure continuity of the wing position commands at all times. The sample, hold, and logic elements prevent the waveform generator 180 from responding to high frequency variations in the control system commands that can distort the waveforms in mid-cycle. The waveforms thus generated by the waveform generator 180 comprise continuous biased cosine waves, an example of which is shown in FIG. 5.

The method used to compute the cycle-averaged aerodynamic forces and their sensitivities to variations in the control input parameters is shown below. G(t) is defined to be a generalized force aligned with a principal body-axis direction that may represent either a force or a moment. To compute the cycle-averaged generalized forces associated with each wing planform 140, 150, an integral of the following form is evaluated:

$$\overline{G} = \frac{\omega}{2\pi} \int_0^{2\frac{\pi}{\omega}} G(\phi(t)) dt$$

Because introduction of the split-cycle parameter changes the frequency of the cosine wave when $(\omega-\delta)t=\pi$ in each cycle, it is convenient to split the integral as follows:

$$\overline{G} = \frac{\omega}{2\pi} \left[ \int_0^{\frac{\pi}{\omega-\delta}} G(\phi_U(t))dt + \int_{\frac{\pi}{\omega-\delta}}^{\frac{\pi(3\omega-2\delta)}{2\omega(\omega-\delta)}} G(\phi_{D1}(t))dt + \int_{\frac{\pi(3\omega-2\delta)}{2\omega(\omega-\delta)}}^{\frac{2\pi}{\omega}} G(\phi_{D2}(t))dt \right]$$

The control derivatives associated with a generalized cycle-averaged force are calculated by computing the partial derivative with respect to each control input variable about the hover frequency $\omega_0$ as shown in the following.

$$\overline{G}_{\Delta\omega_{LW}} = \frac{\partial \overline{G}}{\partial \omega_{LW}} \bigg|_{\omega_{LW}=\omega_o, \delta_{LW}=0, A_{LW}=A, \eta_{LW}=0}$$

$$\overline{G}_{\delta_{LW}} = \frac{\partial \overline{G}}{\partial \delta_{LW}} \bigg|_{\omega_{LW}=\omega_o, \delta_{LW}=0, A_{LW}=A, \eta_{LW}=0}$$

$$\overline{G}_{\eta_{LW}} = \frac{\partial \overline{G}}{\partial \eta_{LW}} \bigg|_{\omega_{LW}=\omega_o, \delta_{LW}=0, A_{LW}=A, \eta_{LW}=0}$$

$$\overline{G}_{\Delta\omega_{RW}} = \frac{\partial \overline{G}}{\partial \omega_{RW}} \bigg|_{\omega_{RW}=\omega_o, \delta_{RW}=0, A_{RW}=A, \eta_{RW}=0}$$

$$\overline{G}_{\delta_{RW}} = \frac{\partial \overline{G}}{\partial \delta_{RW}} \bigg|_{\omega_{RW}=\omega_o, \delta_{RW}=0, A_{RW}=A, \eta_{RW}=0}$$

$$\overline{G}_{\eta_{RW}} = \frac{\partial \overline{G}}{\partial \eta_{RW}} \bigg|_{\omega_{RW}=\omega_o, \delta_{RW}=0, A_{RW}=A, \eta_{RW}=0}$$

These derivatives or sensitivities are used as design parameters for the control system for the aircraft 100. As disclosed herein, the amplitude of the wingbeats was fixed and the split cycle control method was used to control wingbeat frequency and the parameters $\omega_{LW}$, $\delta_{LW}$, $\eta_{LW}$, $\omega_{RW}$, $\delta_{RW}$, and $\eta_{RW}$, because wingbeat frequency $\omega$ has a similar effect as wingbeat amplitude A. If desired, the amplitude of the first wing planform $A_{LW}$ and the second wing planform $A_{RW}$ could be varied and used as control inputs. Practical values for the amplitude A are on the order 60°. Therefore, either frequency or amplitude modulation can be used as effective means for control. Moreover, the disclosed methods could be used to control the frequency and amplitude of more than two wing planforms, if desired.

The control derivatives form the elements of a control effectiveness matrix defined by:

$$B_A = \begin{bmatrix} \frac{\partial \overline{F}_x}{\partial \omega_{LW}} & \frac{\partial \overline{F}_x}{\partial \delta_{LW}} & \frac{\partial \overline{F}_x}{\partial \eta_{LW}} & \frac{\partial \overline{F}_x}{\partial \omega_{RW}} & \frac{\partial \overline{F}_x}{\partial \delta_{RW}} & \frac{\partial \overline{F}_x}{\partial \eta_{RW}} \\ \frac{\partial \overline{F}_y}{\partial \omega_{LW}} & \frac{\partial \overline{F}_y}{\partial \delta_{LW}} & \frac{\partial \overline{F}_y}{\partial \eta_{LW}} & \frac{\partial \overline{F}_y}{\partial \omega_{RW}} & \frac{\partial \overline{F}_y}{\partial \delta_{RW}} & \frac{\partial \overline{F}_y}{\partial \eta_{RW}} \\ \frac{\partial \overline{F}_z}{\partial \omega_{LW}} & \frac{\partial \overline{F}_z}{\partial \delta_{LW}} & \frac{\partial \overline{F}_z}{\partial \eta_{LW}} & \frac{\partial \overline{F}_z}{\partial \omega_{RW}} & \frac{\partial \overline{F}_z}{\partial \delta_{RW}} & \frac{\partial \overline{F}_z}{\partial \eta_{RW}} \\ \frac{\partial \overline{M}_x}{\partial \omega_{LW}} & \frac{\partial \overline{M}_x}{\partial \delta_{LW}} & \frac{\partial \overline{M}_x}{\partial \eta_{LW}} & \frac{\partial \overline{M}_x}{\partial \omega_{RW}} & \frac{\partial \overline{M}_x}{\partial \delta_{RW}} & \frac{\partial \overline{M}_x}{\partial \eta_{RW}} \\ \frac{\partial \overline{M}_y}{\partial \omega_{LW}} & \frac{\partial \overline{M}_y}{\partial \delta_{LW}} & \frac{\partial \overline{M}_y}{\partial \eta_{LW}} & \frac{\partial \overline{M}_y}{\partial \omega_{RW}} & \frac{\partial \overline{M}_y}{\partial \delta_{RW}} & \frac{\partial \overline{M}_y}{\partial \eta_{RW}} \\ \frac{\partial \overline{M}_z}{\partial \omega_{LW}} & \frac{\partial \overline{M}_z}{\partial \delta_{LW}} & \frac{\partial \overline{M}_z}{\partial \eta_{LW}} & \frac{\partial \overline{M}_z}{\partial \omega_{RW}} & \frac{\partial \overline{M}_z}{\partial \delta_{RW}} & \frac{\partial \overline{M}_z}{\partial \eta_{RW}} \end{bmatrix} \bigg|_{\omega_{LW}=\omega_{RW}=\omega_o, \delta_{LW}=\delta_{RW}=0, A_{LW}=A_{RW}=A, \eta_{LW}=\eta_{RW}=0}$$

Where $\overline{F}_x$ is the cycle-averaged vertical force that acts along the x-body axis of the fuselage, $\overline{F}_y$ is the cycle-averaged side force acting along the y-body axis of the fuselage, $\overline{F}_z$ is the cycle-averaged horizontal force acting along the z-body axis of the fuselage, $\overline{M}_x$ is the cycle-averaged rolling moment, $\overline{M}_y$ is the cycle-averaged pitching moment, and $\overline{M}_z$ is the cycle-averaged yawing moment produced by a pair of flapping wings whose motion is defined by the left and right wing symmetric frequencies $\omega_{LW}$, $\omega_{RW}$, split cycle parameters $\delta_{LW}$, $\delta_{RW}$, and wing position biases $\eta_{LW}$, $\eta_{RW}$, respectively. Analysis has shown that the split cycle waveforms as described in this disclosure are effective at generating controllable values of $\overline{F}_x$, $\overline{F}_z$, $\overline{F}_y$, $\overline{M}_x$, $\overline{M}_y$, and $\overline{M}_z$.

Figure 4:
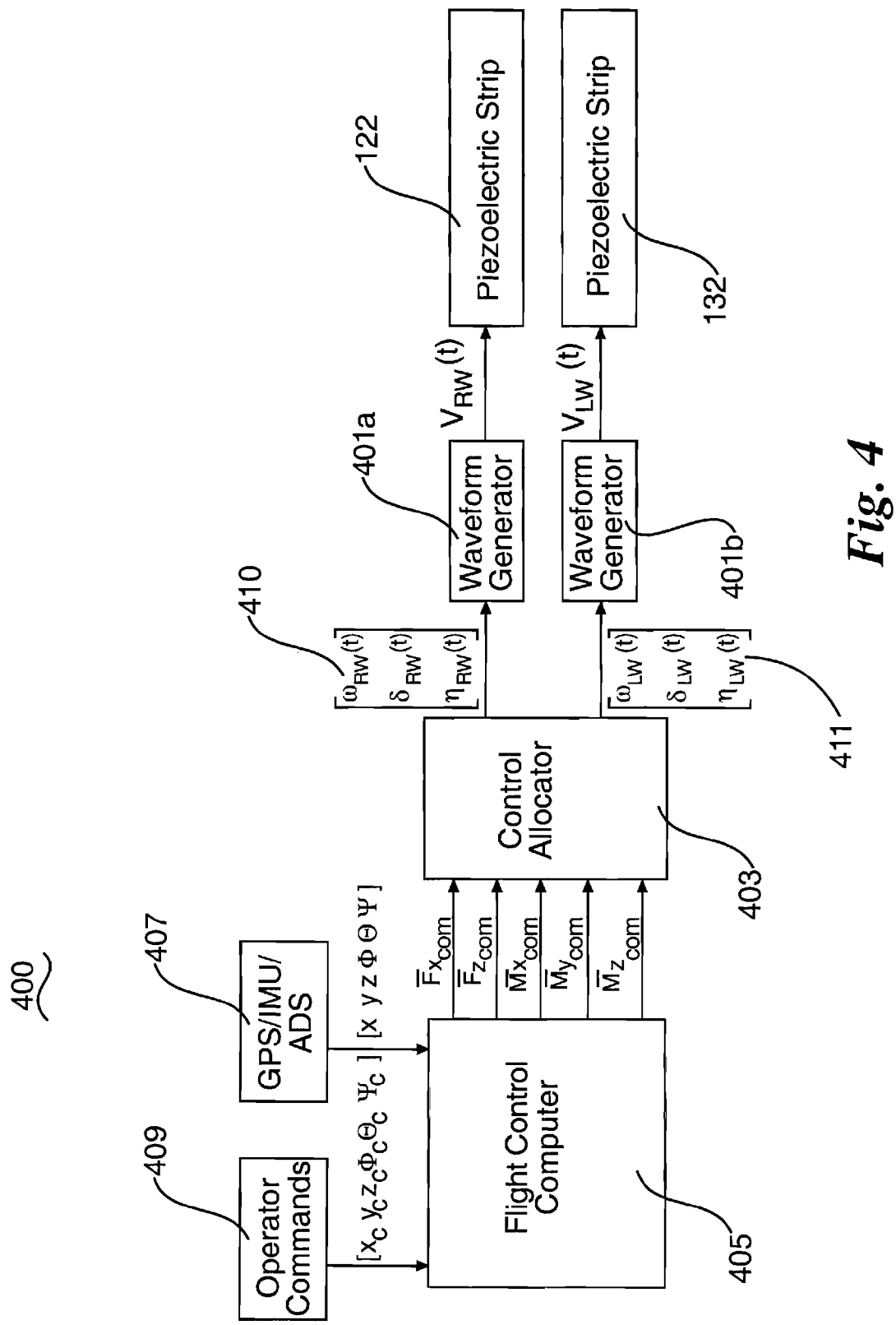
FIG. 4 shows a flight control system.

A block diagram of the flight control system for the aircraft 100 is shown in FIG. 4. An operator command processor 409 provides instantaneous values of the desired aircraft state to a flight control computer 405 in the form of inertial positions $x_c$, $y_c$, and $z_c$ and vehicle attitude, which can be expressed in Euler angles, $\phi_c$, $\theta_c$, and $\psi_c$. A sensor package 407 comprising an inertial measurement unit, a GPS receiver, and an air data system provides the actual position and orientation of the fuselage 110 to the flight control computer 405. The flight control computer 405 compares the operator commands to the actual state of the aircraft 100 and generates a vector of desired cycle-averaged force and moment commands $\overline{F}_{x_{com}}$, $\overline{F}_{z_{com}}$, $\overline{M}_{x_{com}}$, $\overline{M}_{y_{com}}$, and $\overline{M}_{z_{com}}$. The flight control laws in the flight control computer 405 can be designed using any convenient method such as classical control methods, linear quadratic Gaussian methods, or nonlinear adaptive control methods. The desired cycle averaged forces and moments are transformed into right wing 410 and left wing 411 waveform parameter commands by a control allocator 403. Each of these waveform parameter commands is then used to independently control the position of one of the wing planforms 140, 150. The control allocator 403 can be implemented using any number of standard techniques developed for control allocation; however, the simplest is that of computing the pseudo-inverse of the control effectiveness which is $$B_A^+ = (B_A^T B_A)^{-1} B_A^T \text{ in order to compute}$$

$$\begin{bmatrix} \omega_{LW} \\ \delta_{LW} \\ \eta_{LW} \\ \omega_{RW} \\ \delta_{RW} \\ \eta_{RW} \end{bmatrix} = B_A^+ \begin{bmatrix} \overline{F}_{x_{com}} \\ \overline{F}_{z_{com}} \\ \overline{M}_{x_{com}} \\ \overline{M}_{y_{com}} \\ \overline{M}_{z_{com}} \end{bmatrix}$$

The waveform parameters for the left wing 411 and right wing 410 that are generated by the control allocator 403 form the input to two instantiations of a waveform generator 401a, 401b. Each waveform generator 401a, 401b supplies a time varying voltage to a respective one of the piezoelectric strips 122, 132 to generate the desired flapping motion of a respective wing planform 140, 150. The different flapping motion of each wing planform 140, 150 generates aerodynamic forces and moments that cause the fuselage 110 to be attracted to a desired position and attitude set point specified by the operator command processor 409. Because the aerodynamic forces are periodic functions of time, the flight control computer 405 enables the aircraft 100 to orbit a desired position and attitude set point.

The foregoing disclosure has been presented for purposes of illustration and description and is not intended to be exhaustive or to limit the disclosure to the devices, systems, methods, and forms disclosed herein. Persons skilled in the art will realize and appreciate that many modifications and variations are possible in light of the above teaching. For example, piezoelectric actuators, flexible strips, and linkages were used to move the wing planforms of the aircraft, but many other types of prime movers could be utilized. Linear or rotary electric motors coupled with gearing and linkages could be used to impart split-cycle motion to the wings of an aircraft. Furthermore, as noted in the disclosure, wingbeat amplitude could be controlled to impart split-cycle modulation to the wing planforms while maintaining a constant frequency. The control effectiveness matrix can be computed based on a constant wingbeat frequency that is tuned for a particular amplitude associated with quasi-hover. The wingbeat amplitude would then appear as a control input in the control effectiveness matrix and the control law would otherwise be implemented as described in preferred embodiment. The disclosed methods and devices may be used to control multiple pairs of wing planforms of a flapping wing air vehicle. The disclosed methods and associated devices and their variations were described to best explain the principles of the invention and its practical applications to thereby enable other persons skilled in the art to make and use the invention in its various forms and with its various modifications as are suited to the particular uses contemplated. The scope of the invention is to be defined by the following claims.

What is claimed is:

1. A method for shaping a wing velocity profile for an aircraft having a first wing planform and a second wing planform that perform an upstroke and a downstroke over a complete wingbeat cycle, comprising:
    generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments; and,
    wherein the wing position commands comprise velocities and positions with temporally symmetric and asymmetric components for the first and second wing planforms so that the first and second wing planforms produce independently-controlled, cycle averaged forces in the vertical and horizontal directions that produce controlled six-degrees-of-freedom for the aircraft.

2. A method for shaping a wing velocity profile for an aircraft having a first wing planform and a second wing planform that perform an upstroke and a downstroke over a complete wingbeat cycle, comprising:
    generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments; and,
    wherein the wing position commands comprise cosine waves of different frequencies and amplitudes that are combined over a complete wingbeat cycle to produce a waveform with symmetric and asymmetric components that are continuous over the wingbeat cycle for each of the first and second wing planforms.

3. A method for shaping a wing velocity profile for an aircraft having a first wing planform and a second wing planform that perform an upstroke and a downstroke over a complete wingbeat cycle, comprising:
    generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments; and,
    wherein each of the first and second wing planforms is powered by a single actuator that is controlled by wing position commands to generate temporally symmetric and asymmetric wing positions for the upstroke and downstroke of the first and second wing planforms according to the following equations:

$$\phi_U(t) = A\cos[(\omega - \delta)t] + \eta \ \forall \ 0 \le t < \frac{\pi}{\omega - \delta}$$

$$\phi_{D1}(t) = A\cos[(\omega + \sigma)t + \xi] + \eta \ \forall \ \frac{\pi}{\omega - \delta} \le t < \frac{\pi(3\omega - 2\delta)}{2\omega(\omega - \delta)}$$

$$\phi_{D2}(t) = [A + \Delta A]\cos[(\omega + \sigma)t + \xi] + \eta \ \forall \ \frac{\pi(3\omega - 2\delta)}{2\omega(\omega - \delta)} \le t \le \frac{2\pi}{\omega}.$$

4. A method for shaping a wing velocity profile for an aircraft having a first wing planform and a second wing planform that perform an upstroke and a downstroke over a complete wingbeat cycle, comprising:
    generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments; and,
    wherein the wing position commands are generated by a waveform generator that computes an upstroke wing position command, a first half downstroke wing position command, and a last half downstroke wing position command and applies the appropriate upstroke or downstroke wing position command depending on the current position of the first and second wing planform.

5. A method for shaping a wing velocity profile for an aircraft having a first wing planform and a second wing planform that perform an upstroke and a downstroke over a complete wingbeat cycle, comprising:

generating time-varying upstroke and downstroke biased wing position commands for each of the first and second wing planforms to produce nonharmonic wing flapping trajectories that generate non-zero, cycle averaged wing drag and alter the cycle-averaged center of pressure of each of the first and second wing planforms relative to a center of gravity of the aircraft, wherein the drag can be controlled to cause horizontal translation forces and rolling moments for the aircraft and movement of the cycle-averaged center of pressure of each of the first and second wing planforms can be controlled to generate pitching moments; and, wherein the period and amplitude of the wingbeat cycle are maintained at a constant value, with the exception of adjusting the amplitude of the second half of the downstroke to maintain wing position continuity, the upstroke and downstroke frequencies of the first and second wing planforms are varied to produce temporally asymmetric velocities for the first and second wing planforms over the wingbeat cycle, and the biases are varied to produce a different cycle-averaged center of pressure for each of the first and second wing planforms.

6. A method for controlling wing velocity of a wing planform of a flapping wing air vehicle using split-cycle constant period frequency modulation with wing bias control to generate time-varying upstroke and downstroke wing position commands, comprising:

calculating an upstroke, a first half downstroke, and a second half downstroke position command for the wing planform;

determining if the wing planform is in an upstroke, first half downstroke, or second half downstroke position;

outputting an appropriate wing position command depending on the position of the wing planform; and, converting the wing position command to a voltage and applying the voltage to a piezoelectric strip to change the position of the wing planform.

7. The method of claim 6, wherein the upstroke, the first half downstroke, and the second half downstroke commands are calculated based on the following equations:

$$\phi_U(t) = A\cos[(\omega - \delta)t] + \eta \ \forall \ 0 \le t < \frac{\pi}{\omega - \delta}$$

$$\phi_{D1}(t) = A\cos[(\omega + \sigma)t + \xi] + \eta \ \forall \ \frac{\pi}{\omega - \delta} \le t < \frac{\pi(3\omega - 2\delta)}{2\omega(\omega - \delta)}$$

$$\phi_{D2}(t) = [A + \Delta A]\cos[(\omega + \sigma)t + \xi] + \eta \ \forall \ \frac{\pi(3\omega - 2\delta)}{2\omega(\omega - \delta)} \le t \le \frac{2\pi}{\omega}.$$

8. The method of claim 6, wherein the wing position commands have different frequencies and amplitudes over a complete wingbeat cycle to produce temporally asymmetric but continuous waveforms to control the position and velocity of the wing planform.

9. The method of claim 6, wherein the wing position commands are generated to change a current position and attitude of an aircraft fuselage to a desired position and attitude.

10. A split-cycle constant-period with bias waveform generator for controlling the position of a wing planform to produce temporally asymmetric wing positions and velocities for the wing planform over a wingbeat cycle, comprising:

an upstroke computation block for computing an upstroke command for the wing planform;

a first multiplier that receives the upstroke command from the upstroke computation block and multiplies the upstroke command by a binary value based on the position of the wing planform to generate an upstroke wing position command;

a first half downstroke computation block for computing a first half downstroke command for the wing planform;

a second multiplier that receives the first half downstroke command from the first half downstroke computation block and multiplies the first half downstroke command by a binary value based on the position of the wing planform to generate a first half downstroke wing position command;

a second half downstroke computation block for computing a second half downstroke command for the wing planform;

a third multiplier that receives the second half downstroke command from the second half downstroke computation block and multiplies the second half downstroke command by a binary value based on the position of the wing planform to generate a second half downstroke wing position command;

a summer that receives and adds the upstroke wing position command, the first half downstroke wing position command, and the second half downstroke wing position command to generate a position command signal for the wing planform; and, a converter that converts the position command signal to a voltage that is applied to a piezoelectric strip to change the position and velocity of the wing planform.

11. The waveform generator of claim 10, further comprising a multiplexor that supplies data necessary to construct each portion of a split-cycle waveform command including $\Delta A_i$, $\omega_i$, $\delta_i$, t, and, $\eta_{i-1}$, where $\xi_i$ and $\sigma_i$ are functions of $\omega_i$ and $\delta_i$.

12. The waveform generator of claim 10, further comprising a delay that outputs the value of wingbeat bias from the previous wingbeat cycle so that a continuous wingbeat forcing function may be maintained.

13. The waveform generator of claim 10, wherein the upstroke computation block computes the upstroke command according to the equation:

$$\phi_U(t) = A\cos[(\omega - \delta)t] + \eta \ \forall \ 0 \le t < \frac{\pi}{\omega - \delta};$$

wherein the first half downstroke computation block computes the first half downstroke command according to the equation:

$$\phi_{D1}(t) = A\cos[(\omega + \sigma)t + \xi] + \eta \ \forall \ \frac{\pi}{\omega - \delta} \le t < \frac{\pi(3\omega - 2\delta)}{2\omega(\omega - \delta)};$$

and, wherein the second half downstroke computation block computes the second half downstroke command according to the equation:

$$\phi_{D2}(t) = [A + \Delta A]\cos[(\omega + \sigma)t + \xi] + \eta \ \forall \ \frac{\pi(3\omega - 2\delta)}{2\omega(\omega - \delta)} \leq t \leq \frac{2\pi}{\omega}.$$

14. The waveform generator of claim 10, further comprising:
   a series of logic elements that receive the position command and generate binary inputs for the first, second, and third multipliers; and,
   a clock that resets each time the wing planform begins an upstroke cycle.

15. A flight control system for a flapping wing aircraft, comprising:
   an operator command processor that generates instantaneous values of a desired state of the aircraft as inertial positions and aircraft attitude;
   a sensor package that includes an inertial measurement unit, a GPS receiver, and an air data system that provides an actual position of the aircraft and an orientation of the fuselage of the aircraft;
   a flight control computer that receives the inertial position and aircraft attitude values from the operator command processor and compares those values to the actual aircraft position and fuselage orientation that is received from the sensor package and generates a vector of desired cycle averaged force and moment commands;
   a control allocator that converts the desired cycle averaged forces and moments output from the flight control computer into a waveform parameter command for each of the flapping wings of the aircraft;
   a waveform generator that receives the waveform parameter command for each flapping wing and generates a time varying voltage for a piezoelectric strip that powers a respective wing to generate a desired flapping motion for each respective wing that produces aerodynamic forces and moments that cause the fuselage to be attracted to the desired position and attitude specified by the operator command processor;
   wherein the flight control computer generates force and moment commands $\overline{F}_{x_{com}}$, $\overline{F}_{z_{com}}$, $\overline{M}_{x_{com}}$, $\overline{M}_{y_{com}}$, and $\overline{M}_{z_{com}}$; and,
   the control allocator transforms those commands into left and right wing waveform parameter commands $\omega_{LW}$, $\delta_{LW}$, $\eta_{LW}$, $\omega_{RW}$, and $\eta_{RW}$ according to the following:

$$\begin{bmatrix} \omega_{LW} \\ \delta_{LW} \\ \eta_{LW} \\ \omega_{RW} \\ \delta_{RW} \\ \eta_{RW} \end{bmatrix} = B_A^+ \begin{bmatrix} \overline{F}_{x\,com} \\ \overline{F}_{z\,com} \\ \overline{M}_{x\,com} \\ \overline{M}_{y\,com} \\ \overline{M}_{z\,com} \end{bmatrix}.$$

16. A flight control system for a flapping wing aircraft, comprising:
   an operator command processor that generates instantaneous values of a desired state of the aircraft as inertial positions and aircraft attitude;
   a sensor package that includes an inertial measurement unit, a GPS receiver, and an air data system that provides an actual position of the aircraft and an orientation of the fuselage of the aircraft;
   a flight control computer that receives the inertial position and aircraft attitude values from the operator command processor and compares those values to the actual aircraft position and fuselage orientation that is received from the sensor package and generates a vector of desired cycle averaged force and moment commands;
   a control allocator that converts the desired cycle averaged forces and moments output from the flight control computer into a waveform parameter command for each of the flapping wings of the aircraft;
   a waveform generator that receives the waveform parameter command for each flapping wing and generates a time varying voltage for a piezoelectric strip that powers a respective wing to generate a desired flapping motion for each respective wing that produces aerodynamic forces and moments that cause the fuselage to be attracted to the desired position and attitude specified by the operator command processor; and,
   wherein the desired flapping motion for each respective wing produces a continuous wingbeat of temporally asymmetric velocities for each respective wing to produce independently-controlled forces that provide six-degrees-of-freedom of movement for the aircraft.

\* \* \* \* \*